(12) United States Patent
Fan et al.

(10) Patent No.: US 7,783,533 B1
(45) Date of Patent: Aug. 24, 2010

(54) SYSTEM AND METHOD FOR ENTITY SELECTION OPTIMIZATION

(76) Inventors: Jianqing Fan, 650 Cherry Hill Rd., Princeton, NJ (US) 08540; Yikang Li, 6307 Cash Oaks Dr., Houston, TX (US) 77379

( * ) Notice: Subject to any disclaimer, the term of this patent is extended or adjusted under 35 U.S.C. 154(b) by 0 days.

(21) Appl. No.: 12/131,620

(22) Filed: Jun. 2, 2008

(51) Int. Cl.
  *G06Q 40/00* (2006.01)
(52) U.S. Cl. .................. 705/28; 705/22; 705/35
(58) Field of Classification Search ............ 705/35, 705/22, 28, 37, 38
  See application file for complete search history.

(56) References Cited

U.S. PATENT DOCUMENTS

| | | | |
|---|---|---|---|
| 5,313,392 A | 5/1994 | Temma et al. | |
| 5,893,069 A | 4/1999 | White, Jr. | |
| 6,088,676 A | 7/2000 | White, Jr. | |
| 6,151,582 A * | 11/2000 | Huang et al. | 705/8 |
| 6,366,890 B1 | 4/2002 | Usrey | |
| 7,020,617 B2 * | 3/2006 | Ouimet | 705/7 |
| 7,028,000 B1 | 4/2006 | Li | |
| 7,197,473 B2 | 3/2007 | Li | |
| 7,251,614 B1 | 7/2007 | Li | |
| 2003/0115128 A1 * | 6/2003 | Lange et al. | 705/37 |
| 2004/0006504 A1 * | 1/2004 | Mariamova et al. | 705/10 |

OTHER PUBLICATIONS

Beamon Benita M,; "Supply Chain Design and Analysis Models and Methods"; Feb. 1998; International Journal of Production Economics, vol. 55, No. 3, pp. 281-294.*

Abdel-Malek Layek L, Montanari Roberto,; "An analysis of the multi-product newsboy problem with a budget constraint", Mar. 2004; International Journal of Production Economics, 97 (2005) 296-307.*

Nahmias Steven and Schmidt Charles P.; "An Efficient Heuristic for the Multi-Item Newsboy Problem with a Single Constraint", Oct. 1984; Naval Research Logistics Quarterly, vol. 31, pp. 463-474.*

Layek Abdel-Malek et al., "Exact, approximate, and generic iterative models for the multi-product Newsboy problem with budget constraint," International Journal of Production Economics, Sep. 28, 2004, pp. 189-198, vol. 91, Issue 2, Elsevier.

(Continued)

*Primary Examiner*—Hani Kazimi
*Assistant Examiner*—Michael D Cranford
(74) *Attorney, Agent, or Firm*—James E. Walton (57) ABSTRACT

Selecting one or more entities from a plurality of candidate entities subject to one or more constraints is accomplished by establishing upper and lower profit-margin boundary values and determining an optimal profit-margin value within the boundary values using an iterative process. The iterative process includes one or more iterations of: setting a current profit-margin candidate based on a current upper profit-margin boundary value and a current lower profit-margin boundary value, determining whether the current profit-margin candidate value satisfies the constraint(s), adjusting the current upper or lower profit-margin boundary value based on the current profit-margin candidate value, and determining whether to use the current profit-margin candidate value as the optimal profit-margin value based the current upper profit-margin boundary value and the current lower profit-margin boundary value. The respective quantity for each of the candidate entities is then calculated based on the optimal profit-margin value.

21 Claims, 4 Drawing Sheets

OTHER PUBLICATIONS

Layek Abdel-Malek et al., "On the multi-product newsboy problem with two constraints," Computers & Operations Research, Aug. 2005, pp. 2095-2116, vol. 32, Issue 8, Elsevier.

Layek Abdel-Malek et al., "An analysis of the multi-product newsboy problem with a budget constraint," International Journal of Production Economics, Sep. 18, 2005, pp. 296-307, vol. 97, Issue 3, Elsevier.

Beamon, "Supply Chain Design and Analysis: Models and Methods," International Journal of Production Economics, 1998, pp. 281-294, vol. 55, No. 3.

Lau et al., "The multi-product multi-constraint newsboy problem: Applications, formulation and solution," Journal of Operations Management, Aug. 1995, pp. 153-162, vol. 13, Issue 2, Elsevier.

Lau et al., "The newsstand problem: A capacitated multi-product single-period inventory problem," European Journal of Operational Research, Oct. 11, 1996, pp. 29-42, vol. 94, Issue 1, Elsevier.

Moon et al., "The multi-item newsvendor problem with a budget constraint and fixed ordering costs," Journal of the Operational Research Society, May 2000, pp. 602-608, vol. 51, Issue 5, Stockton Press.

Nahmias et al., "An Efficient Heuristic for the Multi-Item Newsboy Problem with a Single Constraint," Naval Research Logistics Quarterly, 1984, pp. 463-474, vol. 31, John Wiley & Sons, Inc.

Khouja, "The single-period (news-vendor) problem: literature review and suggestions for future research," Omega, the International Journal of Management Science, Oct. 1999, pp. 537-553, vol. 27, Issue 5, Pergamon.

Rajaram, "Assortment planning in fashion retailing: methodology, application and analysis," European Journal of Operational Research, Feb. 15, 2001, pp. 186-208, vol. 129, Issue 1, Elsevier.

Vairaktarakis, "Robust multi-item newsboy models with a budget constraint," International Journal of Production Economics, Jul. 20, 2000, pp. 213-226, vol. 66, Issue 3, Elsevier.

Ben-Daya et al., "On the Constrained Multi-item Single-period Inventory Problem," International Journal of Operations & Production Management, 1993, pp. 104-112, vol. 13, No. 11, MCB University Press.

Erlebacher, "Optimal and Heuristic Solutions for the Multi-Item Newsvendor Problem with a Single Capacity Constraint," Production and Operations Management Journal, 2000, pp. 303-318, vol. 9, Issue 3, Production and Operations Management Society.

Hadley et al., "Single Period Models" in: Hadley et al., "Analysis of Inventory Systems," 1963, Ch. 6, pp. 296-320, Prentice-Hall, Englewood Cliffs, NJ.

Cachon et al., "Category Management and Coordination in Retail Assortment Planning in the Presence of Basket Shopping Consumers," Management Science, Jun. 2007, pp. 934-951, vol. 53, No. 6, Informs.

Kok et al., "Demand Estimation and Assortment Optimization Under Substitution: Methodology and Application," Operations Research, Nov.-Dec. 2007, pp. 1001-1021, vol. 55, No. 6, Informs.

* cited by examiner

| ITEM | QTY | COST | SHELF SPACE UNITS |
|---|---|---|---|
| Product 1 | $x_1$ | $10.00 | 3 |
| Product 2 | $x_2$ | $5.00 | 7 |
| Product 3 | $x_3$ | $8.00 | 5 |
| Product 4 | $x_4$ | $11.00 | 8 |
| Product 5 | $x_5$ | $20.00 | 12 |
| Product 6 | $x_6$ | $18.00 | 10 |
| Product 7 | $x_7$ | $4.00 | 4 |

SYSTEM AND METHOD FOR ENTITY SELECTION OPTIMIZATION

BACKGROUND

1. Field of the Invention

This invention relates generally to business forecasting and analysis, and more particularly to determining buy quantities.

2. Description of Related Art

In today's supply chain environment, the newsboy model is the primary tool for dealing with inventory control with stochastic demands. The model is based on the classical one developed originally by Hadley and Whiten (1963), in which one attempts to maximize the profit subject to the constraint on the budget. They offered a Lagrangian method to solve the problem. Since then, various efforts have been made to solve completely the newsboy problem. Yet, no optimal solution has been found with the lower bounds on the ordered quantities.

It is worthy to note that Hadley and Whitin's Lagrangian method relaxes the non-negativity constraints of the order quantities. This would not have serious consequences if the budget is large enough to cover all items. The issue of non-negativity constraint was not paid too much attention until Lau and Lau (1995, 1996) who observed that relaxing the non-negativity constraints could lead to negative order quantities for some of the considered products. On the other hand, if the non-negativity constraints are not relaxed and Kuhn-Tucker conditions are applied, the number of non-linear equations to be solved simultaneously grows exponentially as the number of products increases. This could be one of the reasons that most existing models relax the lower bounds to make the problem tractable.

Figure 1:
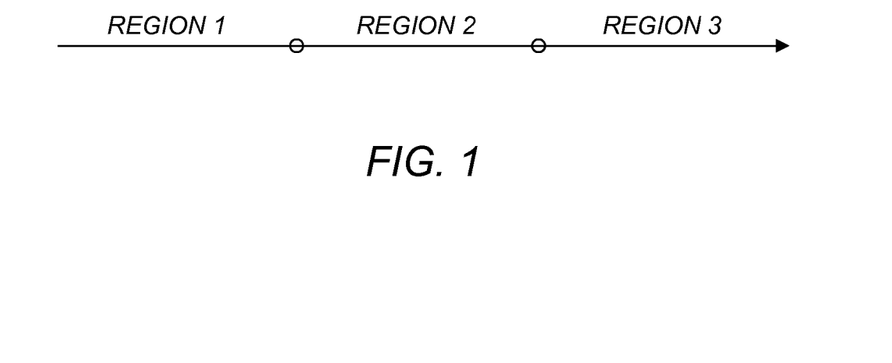
FIG. 1 is a diagram of the regions associated with an approach to solving the classic newsboy problem.

An important advance to the newsboy problem is discussed in Abdel-Malek, et al., "An analysis of the multi-product newsboy problem with a budget constraint," *International Journal of Production Economics*, Volume 97, Issue 3, 18 Sep. 2005, Pages 296-307, which is hereby incorporated by reference, and in Abdel-Malek, et al., "On the multi-product newsboy problem with two constraints," *Computers & Operations Research*, Volume 32, Issue 8, August 2005, Pages 2095-2116, which is hereby incorporated by reference. This approach involves dividing the available budget into three regions as illustrated in FIG. 1. The first region corresponds to the case where the budget is large enough to order the optimum quantity of each item. The second region corresponds to the case where a budget constraint is binding. The third region corresponds to the case where the budget is not large enough to order all of the products. A distinct solution is then determined for each region of the available budget. For the first region, the solution yields the global maxima of the expected profit and the non-negativity constraints are not binding. For the second region, the Lagrangian approach with relaxed lower bounds can be used to determine a solution. Depending on the type of demand distribution for each product, one can choose from exact, approximate, or Generic Iterative Method solution models to obtain the lot size for each product. For the third region, the approach is based on a duality theory and starts by deleting, in ascending order, products with lower marginal utilities at their bounds until the remaining products can fit within the available budget. Then, the non-negativity constraints are relaxed and one can apply one of the solution methods followed in the second region.

Deleting products with lower marginal utilities at their bounds cannot guarantee that the least efficient products will be eliminated. For example, low marginal utility at ordered quantity $Q_i=0$ does not necessarily mean low marginal utility at other points $Q_i>0$. Thus, while this method is sophisticated and intuitively appealing, it does not offer an optimal solution to the newsboy problem.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

FIG. 1 illustrates an exemplary optimization system 10 for evaluating and selecting targeted entities from a large pool of entities. The entity evaluated may be a product, organization, individual, or other identifiable unit. For example, an entity selection process in the retail industry can involve assortment planning that includes deciding which products to include in the product line and determining the inventory levels of these products; an entity selection process in the banking industry can involve selecting targeted customers from a large number of prospect customers for a promotion campaign.

The optimization system 10 includes an input/output (I/O) interface 12, an optimization engine 14, a database 16, and a maintenance interface 18. Alternative embodiments can combine or distribute the input/output (I/O) interface 12, optimization engine 14, database 16, and maintenance interface 18 as desired. Embodiments of the optimization system 10 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 12 provides a communication link between external users, systems, and data sources and components of the optimization system 10. The I/O interface 12 can be configured for allowing one or more users to input information to the optimization system 10 via any known input device. Examples can include a keyboard, mouse, touch screen, microphone, and/or any other desired input device. The I/O interface 12 can be configured for allowing one or more users to receive information output from the optimization system 10 via any known output device. Examples can include a display monitor, a printer, a speaker, and/or any other desired output device. The I/O interface 12 can be configured for allowing other systems to communicate with the optimization system 10. For example, the I/O interface 12 can allow one or more remote computer(s) to access information, input information, and/or remotely instruct the optimization system 10 to perform one or more of the tasks described herein. The I/O interface 12 can be configured for allowing communication with one or more remote data sources. For example, the I/O interface 12 can allow one or more remote data source(s) to access information, input information, and/or remotely instruct the optimization system 10 to perform one or more of the tasks described herein.

The database 16 provides persistent data storage for optimization system 10. While the term "database" is primarily used, a memory or other suitable data storage arrangement may provide the functionality of the database 16. In alternative embodiments, the database 16 can be integral to or separate from the optimization system 10 and can operate on one or more computers. The database 16 preferably provides non-volatile data storage for any information suitable to support the operation of the optimization system 10, including various types of data discussed below in connection with FIGS. 3-5.

The maintenance interface 18 is configured to allow users to maintain desired operation of the optimization system 10. In some embodiments, the maintenance interface 18 can be configured to allow for reviewing and/or revising the data stored in the database 16 and/or performing any suitable administrative tasks commonly associated with database management. This can include, for example, updating database management software, revising security settings, and/or performing data backup operations. In some embodiments, the maintenance interface 18 can be configured to allow for maintenance of the optimization engine 14 and/or the I/O interface 12. This can include, for example, software updates and/or administrative tasks such as security management and/or adjustment of certain tolerance settings.

The optimization engine 14 is configured for selecting targeted entities from a large pool of entities according to concepts disclosed herein. The optimization engine 14 can include various combinations of one or more processors, memories, and software components.

The optimization engine 14 can be configured to select targeted entities based on quantity as a function of profit margin $q_i(m)$ according to a profit optimization approach, which involves maximizing the expected profit, and/or a cost minimization approach, which involves minimizing the expected costs of overestimating and underestimating demand. For example, the optimization engine 14 can be configured to perform a process such as the processes described below in connection with FIGS. 3-5.

Profit Optimization Approach

The profit optimization approach will be described within the context of a retail environment; however, it should be appreciated that this approach applies equally to numerous other fields. For the profit optimization approach, assume that a certain retailer can choose from among n products that can be ordered, with the cost for the retailer of the i-th product being represented as $c_i$. The quantity of the i-th product to be ordered is represented herein as $Q_i$ and the quantity of demand for the i-th product to be ordered is represented herein as $X_i$. The quantity of demand $X_i$ is a random variable having density $f_i(\cdot)$. The unit retail price (i.e., the price per unit for which the retailer will sell the product) for the i-th product is represented herein as $p_i$ and the unit salvage price for the i-th product is represented herein as $s_i$. The profit is determined according to expression (1) below.

$$\sum_{i=1}^{n} \{p_i \min(Q_i, X_i) + s_i \max(Q_i - X_i, 0) - c_i Q_i\} \tag{1}$$

In other words, the profit can be expressed as the difference between income from sales and cost for the products. From expression (1), it can be calculated (as illustrated with interim expression (2)) that the expected profit is given by expression (3) below.

$$\sum_{i=1}^{n} \left\{ p_i \int_0^{Q_i} x_i f_i(x_i) + p_i Q_i \int_{Q_i}^{\infty} f_i(x_i) dx_i + s_i \int_0^{Q_i} (Q_i - x_i) f_i(x_i) dx_i - c_i Q_i \right\} \tag{2}$$

$$= \sum_{i=1}^{n} \left\{ (p_i - c_i) Q_i - (p_i - s_i) \int_0^{Q_i} (Q_i - x_i) f_i(x_i) dx_i \right\} \tag{3}$$

$$= \sum_{i=1}^{n} \pi_i(Q_i)$$

The multi-product newsboy problem is to find a non-negative quantity for each product ($Q_i$) that maximizes the expected profit. In other words, find the maximum value that satisfies expression (3) such that the total cost is less than or equal to a total budget constraint, as required by expression (4a) below, and the quantity is non-negative, as required by expression (4b) below.

$$\sum_{i=1}^{n} c_i Q_i \leq B \tag{4a}$$

$$Q_i \geq 0, i = 1, \ldots, n \tag{4b}$$

Relaxing the nonnegativity constraints and applying the Lagrangian method, the first order condition is shown as expression (5) below.

$$p_i - (1+\lambda)c_i - F_i(Q_i)(p_i - s_i) = 0, \text{ for } i = 1, \ldots, n \tag{5}$$

In expression (5), $F_i$ is the cumulative distribution function (CDF) of the random quantity of demand variable $X_i$. From expression (5), the solution shown below as expression (6) can be found.

$$Q_{i,\lambda}^* = F_i^{-1}\left(\frac{p_i - (1+\lambda)c_i}{p_i - s_i}\right), \text{ for } i = 1, \ldots, n \tag{6}$$

In particular, when $\lambda=0$, expression (6) becomes the global maxima, which is shown below as expression (7).

$$Q_{i,0}^* = F_i^{-1}\left(\frac{p_i - c_i}{p_i - s_i}\right), \text{ for } i = 1, \ldots, n \quad (7)$$

Expression (7) represents the solution when the budget B is unconstrained. In other words, expression (7) is the solution when the budget B satisfies expression (8) below.

$$\sum_{i=1}^{n} c_i Q_{i,0}^* \leq B \quad (8)$$

Note that if $\lambda>0$, then $Q^*_{i,\lambda}$ is not necessarily non-negative for a general distribution $F_i$ (or larger than the specified lower bound) and the i-th summand in expression (3) is neither maximized nor even positive. Intuitively, if the marginal profit functions are constant, for highly profitable items, then the optimal quantity is $Q^*_{i,0}$ when there is sufficient budget to order this amount, and $Q^*_{i,\lambda}$ for some $\lambda>0$ when there is not sufficient budget to order $Q^*_{i,0}$; whereas for less profitable items, $Q^*_i=0$, corresponding to $\lambda=\infty$. Therefore, in general, there does not exist a $\lambda$ such that $Q^*_\lambda=\{Q^*_{1,\lambda}, \ldots, Q^*_{n,\lambda}\}$ is the optimal solution. For this reason, many heuristic approaches have been developed to search for near optimal solutions.

Cost Minimization Approach

Another way of approaching the newsboy problem is from a cost minimization standpoint, where the newsboy problem can be restated based on total cost that includes cost of purchasing products, cost incurred for unsold items, and revenue loss due to missed sales of out-of-stock items. This total cost is determined according to expression (9) below.

$$\sum_{i=1}^{n} \{c_i Q_i + h_i \max(Q_i - X_i, 0) + v_i \max(X_i - Q_i, 0)\} \quad (9)$$

As with the profit optimization approach, for the cost minimization approach there are n products to be ordered with the cost for the i-th product $c_i$, the quantity of the i-th product to be ordered is represented as $Q_i$ and the quantity of demand for the i-th product to be ordered is represented as $X_i$, which is a random variable having density $f_i(\cdot)$. The unit cost per item incurred for the i-th leftover or unsold product at the end of a specified period is represented herein as $h_i$, and unit cost per item of revenue loss incurred for the i-th product is represented herein as $v_i$.

Note that this description follows the notation in Abdel-Malek, et al. (2005) "An analysis of the multi-product newsboy problem With a Budget Constraint," *International Journal of Production Economics,* Volume 97, Issue 3, 18 Sep. 2005, Pages 296-307. From expression (9) it can be calculated that the expected total cost is given by expression (10) below.

$$\sum_{i=1}^{n} \left\{ c_i Q_i + h_i \int_0^{Q_i} (Q_i - x_i) f_i(x_i) dx_i + v_i \int_{Q_i}^{\infty} (x_i - Q_i) f_i(x_i) dx_i \right\}$$

For the cost minimization approach, the multi-product newsboy problem is to find a non-negative quantity for each product ($Q_i$) that minimizes the expected total cost. In other words, find the minimum value that satisfies expression (10) such that the total cost is less than or equal to the total budget constraint, as required by expression (11a) below, and the quantity is non-negative, as required by expression (11b) below.

$$\sum_{i=1}^{n} c_i Q_i \leq B \quad (11a)$$

$$Q_i \geq 0, i=1, \ldots, n \quad (11b)$$

Using the Lagrangian multiplier method, the first order condition gives the solution shown below as expression 12, where $\lambda$ is the Lagrangian multiplier. From expression (12), the global minima can be determined according to expression (13).

$$Q_{i,\lambda} = F_i^{-1}\left(\frac{v_i - (1+\lambda)c_i}{v_i + h_i}\right), \text{ for } i = 1, \ldots, n \quad (12)$$

$$Q_{i,0} = F_i^{-1}\left(\frac{v_i - c_i}{v_i + h_i}\right), \text{ for } i = 1, \ldots, n \quad (13)$$

It follows, then, that the global minimum when the available budget is sufficiently large enough to order the specified quantities according to expression (13) can be determined according to expression (14).

$$B \geq \sum_{i=1}^{n} c_i F_i^{-1}\left(\frac{v_i - c_i}{v_i + h_i}\right) \equiv B_G^{(1)} \quad (14)$$

In other words, the minimum value that satisfies expression (10), such that expressions (11a) and (11b) are satisfied, is given by expression (13) if $B \geq B_G^{(1)}$. The threshold $B_G^{(1)}$ is the lower bound of the third region discussed above in connection with FIG. 1.

Generalized Object Function

In general, the present process provides an analytic solution to the nonlinear programming problem shown below as expression (15). Note that $c_i$ is assumed to be non-negative.

$$\max \sum_{i=1}^{n} \pi_i(Q_i) \text{ such that } \sum_{i=1}^{n} c_i Q_i \leq B, \quad Q_i \geq 0, \quad i = 1, 2, \ldots, n \quad (15)$$

In expression (15), $\pi_i(\cdot)$ is strictly concave with a continuous first derivative. For the profit-maximization approach, for example, determining the maximum value that satisfies expression (3) such that the total cost is less than or equal to the total budget, as required by expression (4a), and the quantity is non-negative, as required by expression (4b), is a specific case of this concave programming problem and is shown as expression (16a) below.

$$\pi_i(Q_i) = (p_i - c_i)Q_i - (p_i - s_i)\int_0^{Q_i}(Q_i - x_i)f_i(x_i)dx_i \quad (16a)$$

For the cost minimization problem, i.e. minimizing the expected total cost (10), subject to constraints (11a) and (11b), it can be regarded as problem (15) with the function $\pi_i(\cdot)$ specified as expression (16b) below.

$$\pi_i(Q_i) = -c_iQ_i - h_i\int_0^{Q_i}(Q_i - x_i)f_i(x_i)dx_i - v_i\int_{Q_i}^{\infty}(x_i - Q_i)f_i(x_i)dx_i \quad (16b)$$

As an example, an investor solution to the problem will now be described. A marginal profit (per monetary unit, e.g., dollar) function is defined after ordering quantity q of the i-th product according to expression (17) below.

$$m_i(q) = \left(\frac{d\pi_i(q)}{dq}\right)\bigg/c_i \quad (17)$$

This expression of $m_i(q)$ is monotonically strictly decreasing. From the investor's point of view, one would only order those products with the most profitable margin, subject to the budget constraints.

The threshold of the maximum profit margin per monetary unit is $m \geq 0$. Accordingly, the most profitable items are those $m_i(q) \geq m$ for some quantity $q > 0$. The ordered quantity is $q_i(m) = m_i^{-1}(m)$ for the selected item so that the profit margin per monetary unit is at least m. Since $m_i(\cdot)$ is strictly decreasing, the solution $q_i(m)$ is unique. By defining $q_i(m)=0$ if $m \geq q_i(0)$, the maximum profit margin of the i-th item. The required budget can be determined according to expression (18) below.

$$B(m) = \sum_{i=1}^{n} c_i q_i(m) \quad (18)$$

Note that B(m) is a strictly decreasing function in m. The profit is maximized when m=0. This requires the budget B in expression (15) to be at least B(0), namely, $B \geq B(0)$. For any budget $B < B(0)$, the most profitable investment is to find $m_0 > 0$ such that $B(m_0) = B$. Such a solution always exists and is unique since $B(\cdot)$ is strictly decreasing with $B(0) > B$ and $B(\infty) = 0$. This solution can be computed expeditiously according to processes discussed below in connection with FIGS. 3 and 5.

It can be shown that the solution $q_i(m_0)$ is the optimal solution to the problem shown as expression (15). First, since the objective function is continuous and the set is compact, there exists a solution to the problem of expression (15). Let $Q^* = (Q_1^*, \ldots, Q_n^*)^T$ be the solution.

Note that $q_i(0)$ is the solution of $\pi_i'(q)=0$, which is the unique maximizer to the concave function $\pi_i(Q_i)$. Thus, the vector $(q_1(0), \ldots, q_n(0))^T$ is the global maximizer when $B \geq B(0)$, namely when the budget is large enough to order these global optimal quantities. Therefore, it is necessary to prove the case $B < B(0)$. In this case, by definition, we have that $m_0 > 0$ and $$\sum_{i=1}^{n} c_i Q_i^* \leq B \quad (19)$$

Write $q_i^* = q_i(m_0)$ and $q^* = (q_1^*, \ldots, q_n^*)$. Then, $$\sum_{i=1}^{n} c_i q_i^* = B(m_0) = B \quad (20)$$

Let $S = \{i : q_i^* > Q_i^*\}$ and $T = \{i : q_i^* < Q_i^*\}$. If S and T are not empty, then it can be shown that products from the set S are under-ordered, and products from the set T are over-ordered. From expressions (19) and (20), we have $$\sum_{i \in S} c_i(q_i^* - Q_i^*) \geq \sum_{i \in T} c_i(Q_i^* - q_i^*) > 0 \quad (21)$$

For the product $i \in S$, since $m_i(q) > m_0$ for $q < q_i^*$, we have $$\pi(q_i^*) - \pi(Q_i^*) > m_0 c_i(q_i^* - Q_i^*) \quad (22)$$

Similarly, for the product $i \in T$, since $m_i(q) < m_0$ for $q > q_i^*$, we obtain $$\pi(Q_i^*) - \pi(q_i^*) < m_0 c_i(Q_i^* - q_i^*) \quad (23)$$

By combining expressions (21), (22), and (23), we obtain $$\sum_{i \in S}\{\pi(q_i^*) - \pi(Q_i^*)\} > m_0 \sum_{i \in S} c_i(q_i^* - Q_i^*) \quad (24)$$
$$\geq m_0 \sum_{i \in T} c_i(Q_i^* - q_i^*)$$
$$> \sum_{i \in T}\{\pi(Q_i^*) - \pi(q_i^*)\}$$

This entails that $$\sum_{i=1}^{n} \pi(Q_i^*) < \sum_{i=1}^{n} \pi(q_i^*),$$

which contradicts with the optimal solution of Q*, and shows that $q^* = Q^*$.

Profit Margin Function

A profit-margin based analysis will now be described for solving the newsboy problem associated with finding the minimum value that satisfies expression (10) such that the total cost is less than or equal to a total budget constraint, as required by expression (11a), and the quantity is non-negative, as required by expression (11b). For this example, as mentioned above in connection with the generalized object function, one takes the expression shown above, and again below, as expression (16b):

$$\pi_i(Q_i) = -c_iQ_i - h_i \int_0^{Q_i} (Q_i - x_i)f_i(x_i)dx_i - v_i \int_{Q_i}^{\infty} (x_i - Q_i)f_i(x_i)dx_i \quad (16b)$$

Then, the profit margin function is shown as expression (25) below.

$$m_i(q) = \frac{v_i - (v_i + h_i)F_i(q)}{c_i} - 1 \quad (25)$$

The maximum profit margin is $m_i(0) = v_i/c_i - 1$. The optimal ordered quantities with the profit margin at least m is determined according to expression (26) below.

$$q_i(m) = \begin{cases} F_i^{-1}\left(\frac{v_i - (1+m)c_i}{v_i + h_i}\right) & \text{when } m < v_i/c_i - 1 \\ 0 & \text{otherwise} \end{cases} \quad (26)$$

The minimum required budget to obtain the global minimum solution is determined according to expression (27) below.

$$B(0) = \sum_{i=1}^{n} c_i F_i^{-1}\left(\frac{v_i - c_i}{v_i + h_i}\right) \quad (27)$$

Also, the required budget for m>0 is $$B(m)\sum_{i=1}^{n} c_i q_i(m) \quad (28)$$

Note that B(m) is a strictly decreasing function in m. The profit is maximized when m=0. This requires the budget B to be at least B(0), or B≧B(0). For any B<B(0), the most profitable investment is to find $m_0 > 0$ such that $B(m_0) = B$. The analytic solution to the optimal quantity is then $q_i(m_0)$, as defined by (26).

The profit-margin analysis described above in connection with expressions (25) through (28) is described in terms of an extension to the cost-minimization approach. It should be appreciated that the profit-margin analysis can be re-stated in an equivalent manner in terms of the profit-optimization approach. For example, the expressions (25) through (27) can be restated as expressions (25a) through (27a), respectively, as shown below. Note that expression (28) would be unchanged.

$$m_i^{(1)}(q) = \frac{p_i - (p_i + s_i)F_i(q)}{c_i} - 1 \quad (25a)$$

$$q_i(m) = \begin{cases} F_i^{-1}\left(\frac{p_i - (1+m)c_i}{p_i - s_i}\right) & \text{when } m < p_i/c_i - 1 \\ 0 & \text{otherwise} \end{cases} \quad (26a)$$

-continued $$B(0) = \sum_{i=1}^{n} c_i F_i^{-1}\left(\frac{p_i - c_i}{p_i - s_i}\right) \quad (27a)$$

Figure 3:
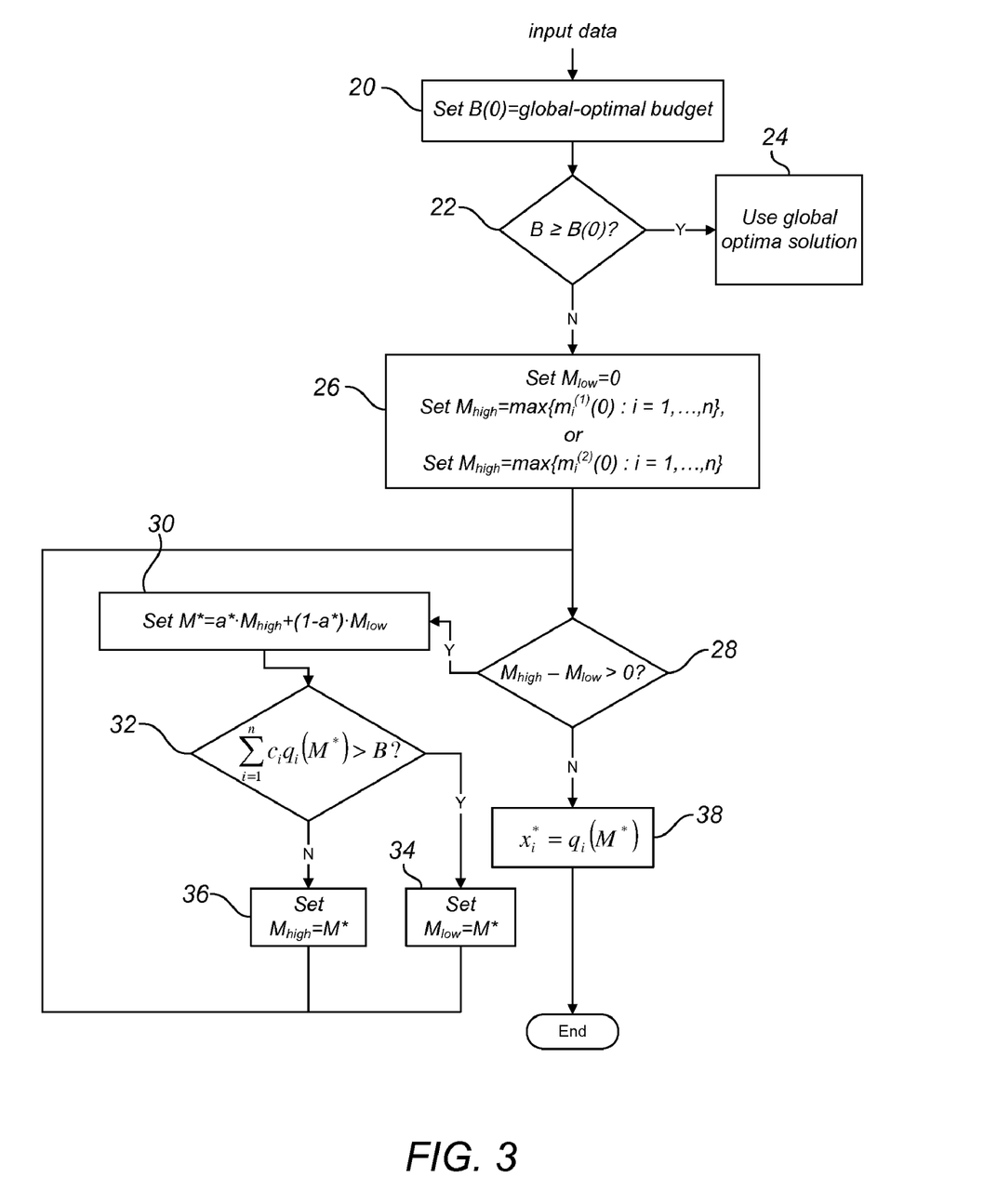
FIG. 3 is a flowchart of a first embodiment of an optimization process.
Figure 4:
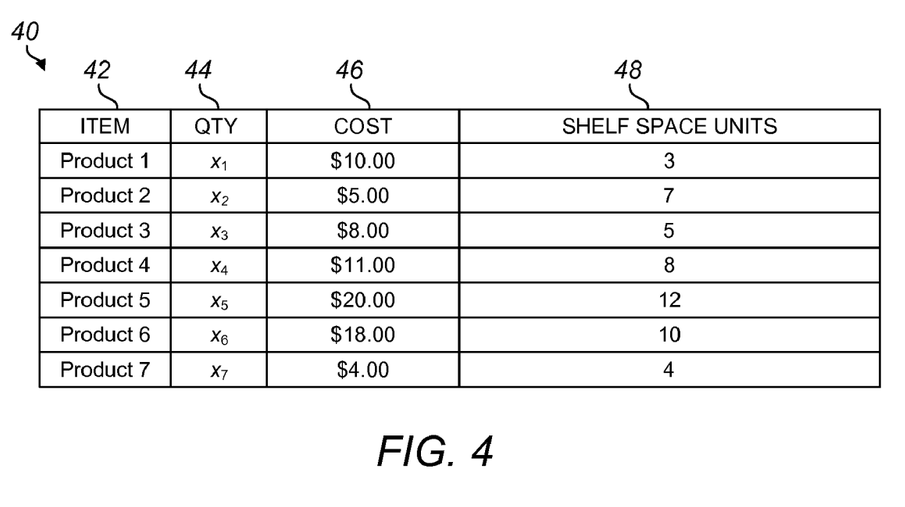
FIG. 4 is a table showing an example of data used by embodiments of the disclosed optimization process.
Figure 5:
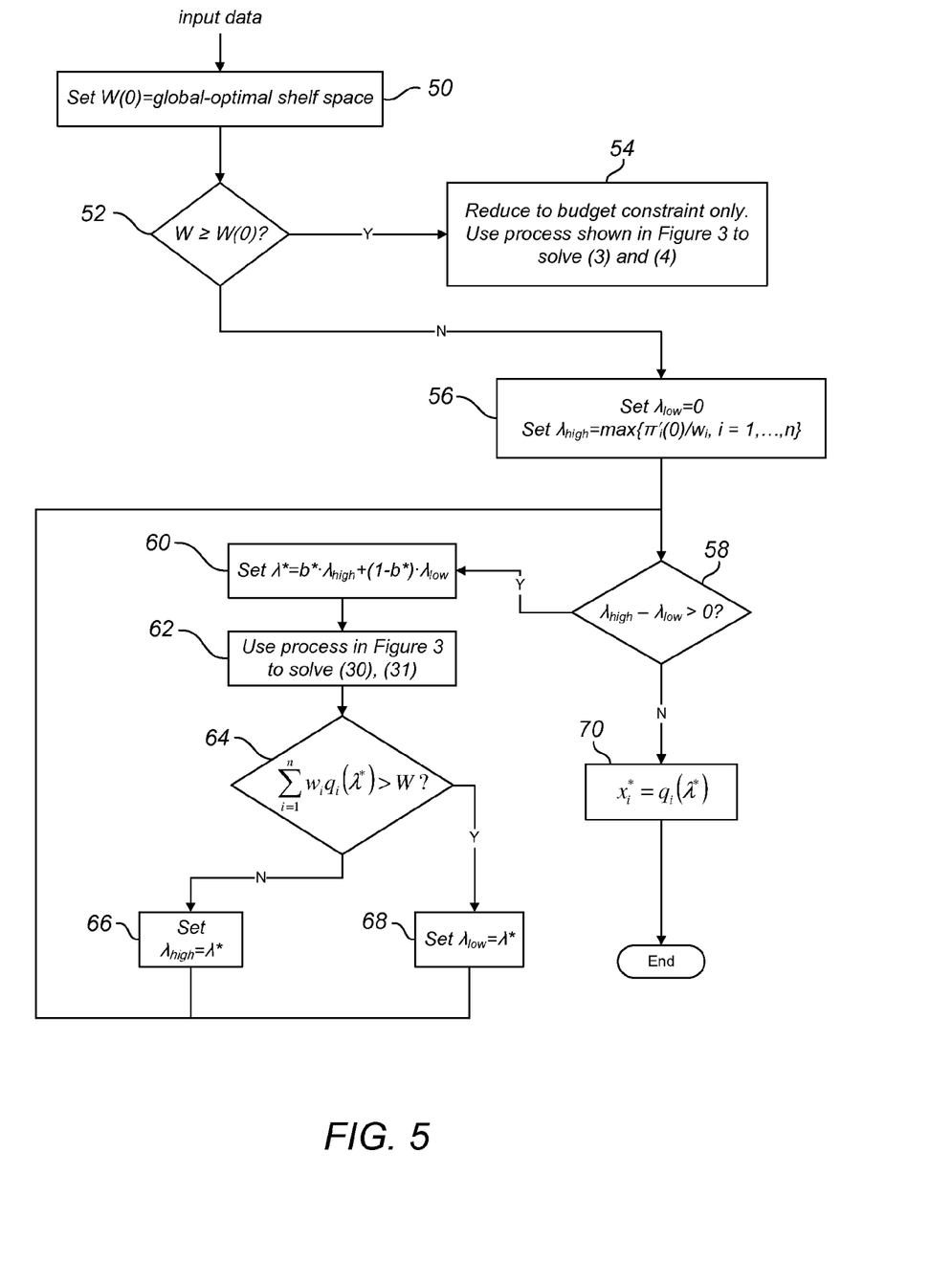
FIG. 5 is a flowchart of a second embodiment of an optimization process.

Turning next to FIGS. 3 through 5, specific examples of process for optimal entity selection will be described. The input data for entity selection depends on the underlying optimization models which describe relevant business applications. In general, input data includes (1) parameters of business models; and (2) stochastic distributions of the defined entities. In the following examples, parameters of business models include:

1) $c_i$—the cost per unit of product i;
2) $p_i$—the unit retail price for the i-th product;
3) $s_i$—the unit salvage price for the i-th product;
4) $w_i$—the units of shelf space required per unit of product i;
5) B—the budget; and
6) W—the total available shelf space.

Alternatively, the parameters can include the leftover cost $h_i$ and revenue loss $v_i$ in place of the unit price $p_i$ and salvage price $s_i$ a cost minimization analysis.

Users can calibrate the parameters based on resources available for the project and relevant business operational data. In the following examples, the density distributions are $f_i(\cdot)$—the density function of the future demand for item i. Note that the default distribution is the normal distribution. Users can specify the mean and standard deviation of the distribution based on statistical analysis or business insights and users can also specify any other types of relevant random distributions, for example Poisson distribution, log-normal distribution, Geometric distribution, and Negative binomial distribution.

With all of these inputs, a system performing a process such as those shown in FIGS. 3 and 5 can generate optimal solutions on the ordered quantity $q_i(m^*)$, i=1, ..., n. Note that the i-th item would not be selected if $q_i(e) = 0$.

Referring first to FIGS. 3 and 4, FIG. 3 shows a flowchart of a first example of an optimal searching process and FIG. 4 shows data used in explaining the process shown in FIG. 3. In some embodiments, the process shown in FIG. 3 can be implemented as software for evaluating and selecting targeted entities from a large pool of entities, for example, where the software is embodied in computer-readable media and executable by one or more computer processors to perform this process. The examples described herein can be as shown in FIG. 3, which is a single-constraint embodiment, specifically where the lone constraint is budget, or can include a single constraint (such as the budget constraint) with specific penalty, as discussed below in connection with FIG. 5. Also, the example shown in FIG. 3 is based on a profit-optimization analysis; however, the process shown in FIG. 3 can alternatively be based on a cost-minimization analysis, for example, by using expressions (25) through (27) in place of expressions (25a) through (27a) where expressions (25a) through (27a) are referenced in the description below.

Figure 2:
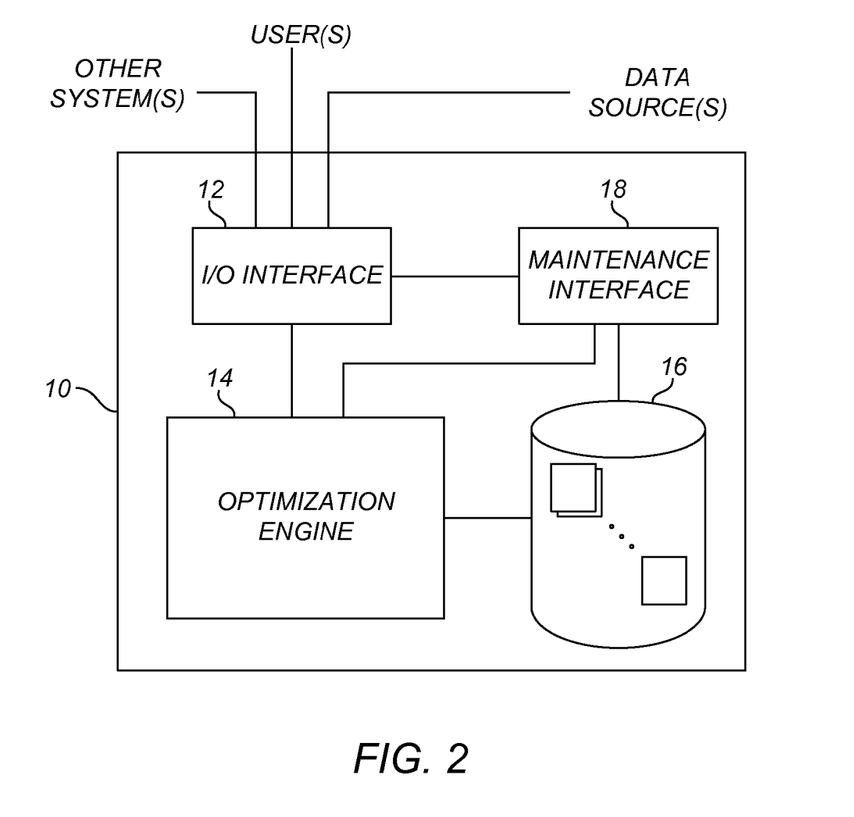
FIG. 2 is a schematic block diagram of an embodiment of an optimization system.

The process shown in FIG. 3 will be described with reference to the system 10 shown in FIG. 2 and the data shown in FIG. 4 for the sake of convenience. The process can be performed by alternative systems and can be performed using different data. In this example, the optimization engine 14 retrieves input data from the database 16; however, in alternative embodiments the optimization engine 14 can retrieve data from the database 16 and/or one or more users, data sources, and/or other systems.

The goal of the process shown in FIG. 3 is to determine an optimal quantity $x_i$ for each of a group of entities that satisfies a single constraint (the lone budget constraint or the budget constraint with specific penalty as discussed below in connection with FIG. 5). In some cases, the optimal quantity $x_i$ can be zero, so the process shown in FIG. 3 is also an optimal selection process in that only a subset of all available products might be found to have non-zero optimal quantities $x_i$. In this example, the specific goal is to determine an optimal quantity $x_i$ for each of the products Product 1 through Product 7 in the table 40 shown in FIG. 4 that satisfies a budget constraint such that the cost for all of the products is within the budget B of a certain retailer. The table 40 includes item description data 42, quantity data 44, cost data 46, and space requirements data 48. This and other data, including the budget B, can be pre-fetched by the optimization engine 10, or fetched as the process progresses, from the database 16.

At block 20, a global optimal solution according to $x^*_i = q_i(0)$ (e.g., using expression (26a) above for profit maximization problem of expression (3) with constraints of expression (4)) is calculated, meaning that a set of optimal quantities $x^*_i$ that provides for maximum profits without regard to the budget constraint is determined. A minimum global-optimal budget B(0) is also calculated as the minimum budget required to purchase the quantities $x^*_i$.

Next, at block 22, the retailer's budget B is compared to the minimum global-optimal budget B(0). If the retailer's budget B is greater than or equal to the minimum global-optimal budget B(0), then the optimal solution is to purchase the global optimal quantities $x^*_i$ as noted in block 24. Otherwise, the process continues to block 26.

At block 26, variables $M_{low}$ and $M_{high}$ are created. The value of the variable $M_{low}$ is set equal to zero, and the value of the variable $M_{high}$ is set equal to the maximum value in the set of global-optimal profit margins $m_i^{(1)}(0)$ calculated (e.g., using expression (25a) above for profit maximization problem (3) with constraints (4)) using the set of global-optimal quantities $x^*_i$ for the case of budget constraint only, or is set equal to the maximum value in the set of global-optimal profit margins $m_i^{(2)}(0)$ calculated (e.g., using expression (25b) below for maximization problem (30) with constraints (31a) and (31b)) using the set of global-optimal quantities $x^*_i$ for the case of both budget and shelf space constraints. The variables $M_{low}$ and $M_{high}$ represent lower and upper profit-margin boundaries, respectively, within which an optimal profit margin M* will be found.

At block 28, the process verifies that the difference between $M_{high}$ and $M_{low}$ is substantially non-zero, and if so, the process continues to block 30. At block 30, the variable M* is set equal to the generalized weighted average of the current respective values of $M_{high}$ and $M_{low}$ (M*=a*·$M_{high}$+(1−a*)·$M_{low}$). The weights can change from iterations to iterations. In practice, this weight does not frequently change with iteration. Typical values for a* can include a*=0.5, a*=0.618, a*=0.382, or other values, preferably between 0 and 1, that one would like to use. The process, specifically as illustrated in blocks 28 through 36, will adjust the respective values of $M_{high}$, $M_{low}$, and M* until the value of M* is equal to the highest possible profit margin that satisfies the constraint—which in this example is the budget B constraint.

Note that this adjustment process will typically continue through several iterations of blocks 28 through 36, each time adjusting the value of M*; also, some iterations will result in the adjustment of the value of $M_{high}$ while other iterations will result in the adjustment of the value of $M_{low}$. As the respective values of $M_{high}$ and $M_{low}$ change, the result of the calculation at block 28 will gradually approach zero, eventually getting close enough to zero to be within a predetermined tolerance, for example a predetermined tolerance set by the user or a tolerance dictated by system limitations. Once the difference between $M_{high}$ and $M_{low}$ is thus substantially close enough to zero, the process will continue from block 28 to block 38, where the value of M* will be used in determining the ideal quantities $x^*_i$ (e.g., based on expression (26a) for the profit maximization problem (3) with constraint (4)).

The process of adjusting the respective values of $M_{high}$, $M_{low}$, and M* (until the value of M* is equal to the highest possible profit margin that satisfies the budget B constraint) will now be described in greater detail with reference to blocks 30 through 36 in FIG. 3. As mentioned above, at block 30 the variable M* is set equal to the desired weighted average of the current respective values of $M_{high}$ and $M_{low}$. At block 32, the current value of M* is tested to determine whether it satisfies the budget constraint B. This is accomplished by using the current profit-margin value of M* in expression (26a) to determine each quantity $q_i$, and then multiplying each of these quantities $q_i$ by a respective cost $c_i$ per item and summing as shown in expression (28) to calculate a budget for the current profit-margin value of M*. If the budget required for the current profit-margin value of M* exceeds the retailer's budget B, then the process continues to block 34 where the value of $M_{low}$ is set equal to the value of M*. Otherwise, the process proceeds to block 36 where the value of $M_{high}$ is set equal to the value of M*. The process then returns to block 28, where the difference between where the value of $M_{high}$ and the value of $M_{low}$ is calculated and, as described above, the process either continues for another iteration of blocks 30 through 36 or the process continues to block 38 and then ends.

FIG. 5 shows a flowchart of a second example of an optimal searching process that can be performed by the optimization engine 14. This second example applies to assortment planning, and shows how the first example discussed above in connection with FIG. 3 can be extended to cases where more restrictions are relevant. For assortment planning, (1) shelf space and (2) minimum purchase order are common constraints. First, the shelf space restrictions are introduced by appending expression (3), (4a) and (4b) with the constraint shown in expression (29).

$$\sum_{i=1}^{n} w_i q_i \leq W \quad (29)$$

In expression (29), $w_i$ is representative of the units of shelf space required per unit of product i and W is representative of the total available shelf space. The optimal solution to the profit maximization with both budget and shelf space constraints ((3), (4a), (4b) and (29)) is obtained through following procedure. The procedure is applicable to general concave function $\pi_i(Q_i)$.

a) For any given $\lambda>0$, ($\lambda$ can be thought of as the profit per square foot), find optimal solution, $q_1(\lambda), \ldots, q_n(\lambda)$, to the following profit maximization problem:

$$\max \sum_{i=1}^{n} [\pi_i(q_i) - \lambda \cdot w_i q_i] \quad (30)$$

$$\sum_{i=1}^{n} c_i q_i \leq B \quad (31a)$$

$$q_i \geq 0, i=1, \ldots, n \quad (31b)$$

Note: The profit margin function for expression (30) is then (25b) below.

$$m_i^{(2)}(q) = \frac{p_i - (p_i - s_i)F_i(q) - \lambda \cdot w_i}{c_i} - 1 \quad (25b)$$

The optimal order quantity for problem (30) with constraints (31) with profit margin at least m is then (26b):

$$q_i(m, \lambda) = \quad (26b)$$

$$\begin{cases} F_i^{-1}\left(\frac{p_i - \lambda w_i - (1+m)c_i}{p_i - s_i}\right) & \text{when } m < (p_i - \lambda w_i)/c_i - 1 \\ 0 & \text{otherwise} \end{cases}$$

b) Validate the shelf space constraint is satisfied:

$$\sum_{i=1}^{n} w_i q_i^*(\lambda) = W \quad (32)$$

Note: here $q_i^*(\lambda)$ is the optimal order quantity satisfying the budget constraint.

c) Find the smallest profit per square foot, $\lambda_0$ to satisfy the shelf space constraint.

We now demonstrate that $q_i(\lambda_0), i=1, \ldots, n$, specified by (26b) and (32), is the global optimal solution to the profit maximization problem (3) subject to the budget constraint (4a), non-negativity constraint (4b), and shelf space constraint (29). Consider expression (30), (31a) and (31b) with each given $\lambda \geq 0$. Since $\pi_i(q_i) - \lambda w_i q_i$ is strictly concave in $q_i$, the optimal solution exists according to [0021]. Let the solution be $q_i^*(\lambda)$, $i=1, \ldots, n$. The required shelf space is $$w(\lambda) = \sum_{i=1}^{n} w_i q_i^*(\lambda) \quad (33)$$

Note that as $\lambda$ decreases, the profit margins per dollar increase and hence the ordered quantities increase. Hence, $w(\lambda)$ is a decreasing function of $\lambda$. If $w(0) \leq W$, then we have sufficient shelf space and hence $q_i^*(0), i=1, \ldots, n$ is the global optimal. Otherwise, there exists a $\lambda_0 \geq 0$ such that $$w(\lambda_0) = W \quad (34)$$

since $w(0)>w$ and $w(\infty)=0$. We now show that $q_i^*(\lambda_0)$, $i=1, \ldots, n$ is the solution to expression (35) below, or the combination of (3), (4a), (4b) and (29) above.

$$\max \sum_{i=1}^{n} \pi_i(q_i) \quad (35)$$

$$s.t. \sum_{i=1}^{n} c_i q_i \leq B, \sum_{i=1}^{n} w_i q_i \leq W, \text{ and } q_i \geq 0, i=1, \ldots, n$$

Note that $q_i^*(\lambda_0)$, $i=1, \ldots, n$ solves (30),(31a) and (31b). It follows that $$\sum_{i=1}^{n} [\pi_i(q_i^*(\lambda_0)) - \lambda_0 w_i q_i^*(\lambda_0)] \geq \sum_{i=1}^{n} [\pi_i(q_i) - \lambda_0 w_i q_i]$$

for any $q_i$ satisfies (31a) and (31b). By (34), we have $$\sum_{i=1}^{n} \pi_i(q_i^*(\lambda_0)) \geq \sum_{i=1}^{n} \pi_i(q_i) + \lambda_0 \left[w - \sum_{i=1}^{n} w_i q_i\right]$$

Since $\lambda_0 \geq 0$, by the constraint in (35), we have $$\sum_{i=1}^{n} \pi_i(q_i^*(\lambda_0)) \geq \sum_{i=1}^{n} \pi_i(q_i)$$

for any $q_i$ satisfies the constraints in (35). The optimal solution for the product selection model with both budget and shelf-space constraints can be provided by the process shown in FIG. 5.

The process shown in FIG. 5 will be described with reference to the system 10 shown in FIG. 2 and the data shown in FIG. 4 for the sake of convenience. The process can be performed by alternative systems and can be performed using different data. In this example, the optimization engine 14 retrieves input data from the database 16; however, in alternative embodiments the optimization engine 14 can retrieve data from the database 16 and/or one or more users, data sources, and/or other systems. In some embodiments, the process shown in FIG. 5 can be implemented as software for evaluating and selecting targeted entities from a large pool of entities, for example where the software is embodied in computer-readable media and executable by one or more computer processors to perform this process.

The example shown in FIG. 5 is a dual-constraint embodiment, specifically where the two constraints are budget and shelf space. Thus, the goal of the process shown in FIG. 5 is to determine an optimal quantity $x_i$ for each of a group of entities that satisfies the two constraints. As with the process shown in FIG. 3, in some cases, the optimal quantity $x_i$ can be zero, so the process shown in FIG. 5 is also an optimal selection process in that only a subset of all available products might be found to have non-zero optimal quantities $x_i$. In this example, the specific goal is to determine an optimal quantity $x_i$ for each of the products Product 1 through Product 7 in the table 40 shown in FIG. 4 that satisfies a budget constraint, such that the cost for all of the products is within the budget B of a certain retailer, and also satisfies a shelf-space constraint, such that the retailer will have sufficient shelf space for all of the products. The table 40 includes item description data 42, quantity data 44, cost data 46, and space requirements data 48. This and other data, including the budget B and total available shelf space W, can be pre-fetched by the optimization engine 10, or fetched as the process progresses, from the database 16.

At block 50, a minimum global-optimal amount of shelf space W(0) is calculated, meaning that a set of optimal quantities $x^*_i$ that provides for maximum profits without regard to the shelf-space constraints is determined. $x^*_i$'s are the solutions to expression (3), (4a) and (4b), or solutions to expression (10), (11a) and (11b).

Next, at block 52, the process compares the retailer's shelf space W to the minimum global-optimal shelf space W(0). If the retailer's shelf space W is greater than or equal to the minimum global-optimal shelf space W(0), then the process continues to block 54. At block 54, the process output the solutions to expression (3), (4a) and (4b), or solutions to expression (10), (11a) and (11b). The computation is ended.

At block 56, variables $\lambda_{low}$ and $\lambda_{high}$ are created. The value of the variable $\lambda_{low}$ is set equal to zero, and the value of the variable $\lambda_{high}$ is set equal to the maximum value of highest profits per unit shelf space of all products, i.e. $\lambda_{high} = \max\{\pi'_i(0)/w_i, i=1, \ldots, n\}$, where $\pi'_i(0)$ denotes the derivative function of $\pi_i(q)$ at $q=0$. The variables $\lambda_{low}$ and $\lambda_{high}$ represent lower and upper average profit per square foot boundaries, respectively, within which an average profit per square foot will be found. When $\lambda \geq \lambda_{high}$, the optimal solution to problem (30) subject to constraints (31a) and (31b) is merely $q_i=0$ for all i.

At block 58, the process verifies that the difference between $\lambda_{low}$ and $\lambda_{high}$ is substantially non-zero, and if so, the process continues to block 60. At block 60, the variable $\lambda^*$ is set equal to the generalized weighted average of the current respective values of $\lambda_{high}$ and $\lambda_{low}$ ($\lambda^* = b^* \cdot \lambda_{high} + (1-b^*) \cdot \lambda_{low}$). The weights can change from iterations to iterations. In practice, this weight does not frequently change with iteration. Typical values for $b^*$ can include $b^*=0.5$, $b^*=0.618$, $b^*=0.382$, or other values, preferably between 0 and 1, that one would like to use. The process, specifically as illustrated in blocks 58 through 68, will adjust the respective values of $\lambda_{high}$, $\lambda_{low}$, and $\lambda^*$ until the value of $\lambda^*$ is equal to the least possible profit per square foot that satisfies the constraints—which in this example include the budget B constraint and the shelf space W constraint. Note that this adjustment process will typically continue through several iterations of blocks 58 through 68, each time adjusting the value of $\lambda^*$; also, some iterations will result in the adjustment of the value of $\lambda_{high}$ while other iterations will result in the adjustment of the value of $\lambda_{low}$. As the respective values of $\lambda_{high}$ and $\lambda_{low}$ change, the result of the calculation at block 58 will gradually approach zero, eventually getting close enough to zero to be within a predetermined tolerance, for example a predetermined tolerance set by the user or a tolerance dictated by system limitations. Once the difference between $\lambda_{high}$ and $\lambda_{low}$ is thus substantially close enough to zero, the process will continue from block 58 to block 70, where the value of $\lambda^*$ will be used in determining the ideal quantities $q_i^*$ (e.g., based on expression (26b)).

The process of adjusting the respective values of $\lambda_{high}$, $\lambda_{low}$, and $\lambda^*$ (until the value of $\lambda^*$ is equal to the least possible profit per square foot that satisfies the budget B and shelf-space W constraints) will now be described in greater detail with reference to blocks 60 through 68 in FIG. 5. As mentioned above, at block 60 the variable $\lambda^*$ is set equal to the desired weighted average of the current respective values of $\lambda_{high}$ and $\lambda_{low}$.

At block 62, a profit maximization program, which can perform a process according to the above-described flowchart shown in FIG. 3, is called to solve expression (30), (31a) and (31b) with $\lambda = \lambda^*$.

At block 64, the current value of $\lambda^*$ is tested to determine whether it satisfies the shelf space constraint W. This is accomplished by using the current value of profit-per square foot of $\lambda^*$ to determine each quantity $q_i$, and then multiplying each of these quantities $q_i$ by a respective shelf space $w_i$ per item and summing as shown on the left side in expression (30) to calculate a shelf space for the current value of profit per square foot, $\lambda^*$. If the shelf space required for the current value of profit per square foot, $\lambda^*$ exceeds the retailer's shelf space W, then the process continues to block 68 where the value of $\lambda_{low}$ is set equal to the value of $\lambda^*$. Otherwise, the process proceeds to block 66.

At block 66, the value of $\lambda_{high}$ is set equal to the value of $\lambda^*$. The process then returns to block 58, where the difference between where the value of $\lambda_{high}$ and the value of $\lambda_{low}$ is calculated and, as described above, the process either continues for another iteration of blocks 60 through 68 or the process continues to block 70 and then ends.

While one- and two-constraint examples have been described and shown in FIGS. 3 and 5, respectively, it should be appreciated that the present concepts can be extended to situations involving still more constraints.

The present disclosure provides an entity optimization system and method, where examples have been described that involve selecting products targeted at maximizing profit with budget and/or shelf-space constraints. The examples illustrated in the present disclosure are applicable to business applications that select products with constraints of budgets and/or space. However, the concepts described herein can also be applied to other applications. For example, selecting targeted customers in the credit card industry, promotional campaigns for the catalog industry, marketing campaigns for the pharmaceutical industry, etc. The concepts described herein provide for a particularly efficient process that requires less processing time as compared to prior systems and allows for cost reduction, particularly when large numbers of products or other entities are involved.

It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A computer-implemented method for selecting a set of one or more entities from a plurality of candidate entities subject to one or more constraints, the method being performed using one or more processing units, the method comprising:

establishing upper and lower profit-margin boundary values;

calculating a global-optimal value and determining whether the global-optimal value satisfies the one or more constraints;

determining an optimal profit-margin value using an iterative process with the one or more processing units, wherein the determining of the optimal profit-margin value comprises one or more iterations of:

setting a current profit-margin candidate based on a current upper profit-margin boundary value and a current lower profit-margin boundary value, determining whether the current profit-margin candidate value satisfies the one or more constraints, adjusting one of the current upper and lower profit-margin boundary values based on the current profit-margin candidate value, and determining whether to use the current profit-margin candidate value as the optimal profit-margin value based on at least one of the current upper profit-margin boundary value and the current lower profit-margin boundary value; and calculating a respective quantity for each of the candidate entities based on the optimal profit-margin value.

2. The method of claim 1, wherein the global-optimal value is calculated based on a respective leftover cost for each of the candidate entities and a respective revenue-loss cost for each of the candidate entities.

3. The method of claim 1, wherein the global-optimal value is calculated based on a respective a retail price for each of the candidate entities and a respective salvage price for each of the candidate entities.

4. The method of claim 1, wherein the setting of the current profit-margin candidate value includes setting the profit-margin candidate value equal to an average of the current upper profit-margin boundary value and the current lower profit-margin boundary value.

5. The method of claim 1, wherein the adjusting of one of the current upper and lower profit-margin boundary values is based on whether the current profit-margin candidate value satisfies the constraint and includes changing the thus selected value to the current profit-margin candidate value.

6. The method of claim 1, wherein the iterative process includes determining whether to perform a subsequent iteration of the iterative process based on whether the current upper profit-margin boundary is substantially different than the current lower profit-margin boundary value.

7. The method of claim 1, wherein the determining of whether to use the current profit-margin candidate value as the optimal profit-margin value is based at least in part on the difference between the current upper profit-margin boundary value and the current lower profit-margin boundary value.

8. A system for selecting a set of one or more entities from a plurality of candidate entities subject to one or more constraints, the system comprising one or more processing units and non-volatile memory storing computer-readable instructions for:

establishing upper and lower profit-margin boundary values;

calculating a global-optimal value and determining whether the global-optimal value satisfies the one or more constraints;

determining an optimal profit-margin value using an iterative process with one or more processing units, wherein the determining of the optimal profit-margin value comprises one or more iterations of:

setting a current profit-margin candidate based on a current upper profit- margin boundary value and a current lower profit-margin boundary value, determining whether the current profit-margin candidate value satisfies the one or more constraints, adjusting one of the current upper and lower profit-margin boundary values based on the current profit-margin candidate value, and determining whether to use the current profit-margin candidate value as the optimal profit-margin value based on at least one of the current upper profit-margin boundary value and the current lower profit-margin boundary value; and calculating a respective quantity for each of the candidate entities based on the optimal profit-margin value.

9. The system of claim 8, wherein the global-optimal value is calculated based on a respective leftover cost for each of the candidate entities and a respective revenue-loss cost for each of the candidate entities.

10. The system of claim 8, wherein the global-optimal value is calculated based on a respective a retail price for each of the candidate entities and a respective salvage price for each of the candidate entities.

11. The system of claim 8, wherein the setting of the current profit-margin candidate value includes setting the profit-margin candidate value equal to an average of the current upper profit-margin boundary value and the current lower profit-margin boundary value.

12. The system of claim 8, wherein the adjusting of one of the current upper and lower profit-margin boundary values is based on whether the current profit-margin candidate value satisfies the constraint and includes changing the thus selected value to the current profit-margin candidate value.

13. The system of claim 8, wherein the iterative process includes determining whether to perform a subsequent iteration of the iterative process based on whether the current upper profit-margin boundary is substantially different than the current lower profit-margin boundary value.

14. The system of claim 8, wherein the determining of whether to use the current profit-margin candidate value as the optimal profit-margin value is based at least in part on the difference between the current upper profit-margin boundary value and the current lower profit-margin boundary value.

15. Software for selecting a set of one or more entities from a plurality of candidate entities subject to one or more constraints, the software being embodied in computer-readable media and when executed operable to: establish upper and lower profit-margin boundary values;

calculating a global-optimal value and determining whether the global-optimal value satisfies the one or more constraints;

determine an optimal profit-margin value using an iterative process, wherein the determining of the optimal profit-margin value comprises one or more iterations of:

setting a current profit-margin candidate based on a current upper profit-margin boundary value and a current lower profit-margin boundary value, determining whether the current profit-margin candidate value satisfies the one or more constraints, adjusting one of the current upper and lower profit-margin boundary values based on the current profit-margin candidate value, and determining whether to use the current profit-margin candidate value as the optimal profit-margin value based on at least one of the current upper profit-margin boundary value and the current lower profit-margin boundary value; and calculate a respective quantity for each of the candidate entities based on the optimal profit-margin value;

wherein the computer-readable media is non-transitory.

16. The software of claim 15, wherein the global-optimal value is calculated based on a respective leftover cost for each of the candidate entities and a respective revenue-loss cost for each of the candidate entities.

17. The software of claim 15, wherein the global-optimal value is calculated based on a respective a retail price for each of the candidate entities and a respective salvage price for each of the candidate entities.

18. The software of claim 15, wherein the setting of the current profit-margin candidate value includes setting the profit-margin candidate value equal to an average of the current upper profit-margin boundary value and the current lower profit-margin boundary value.

19. The software of claim 15, wherein the adjusting of one of the current upper and lower profit-margin boundary values is based on whether the current profit-margin candidate value satisfies the constraint and includes changing the thus selected value to the current profit-margin candidate value.

20. The software of claim 15, wherein the iterative process includes determining whether to perform a subsequent iteration of the iterative process based on whether the current upper profit-margin boundary is substantially different than the current lower profit-margin boundary value.

21. The software of claim 15, wherein the determining of whether to use the current profit-margin candidate value as the optimal profit-margin value is based at least in part on the difference between the current upper profit-margin boundary value and the current lower profit-margin boundary value.

* * * * *